Figure 3:
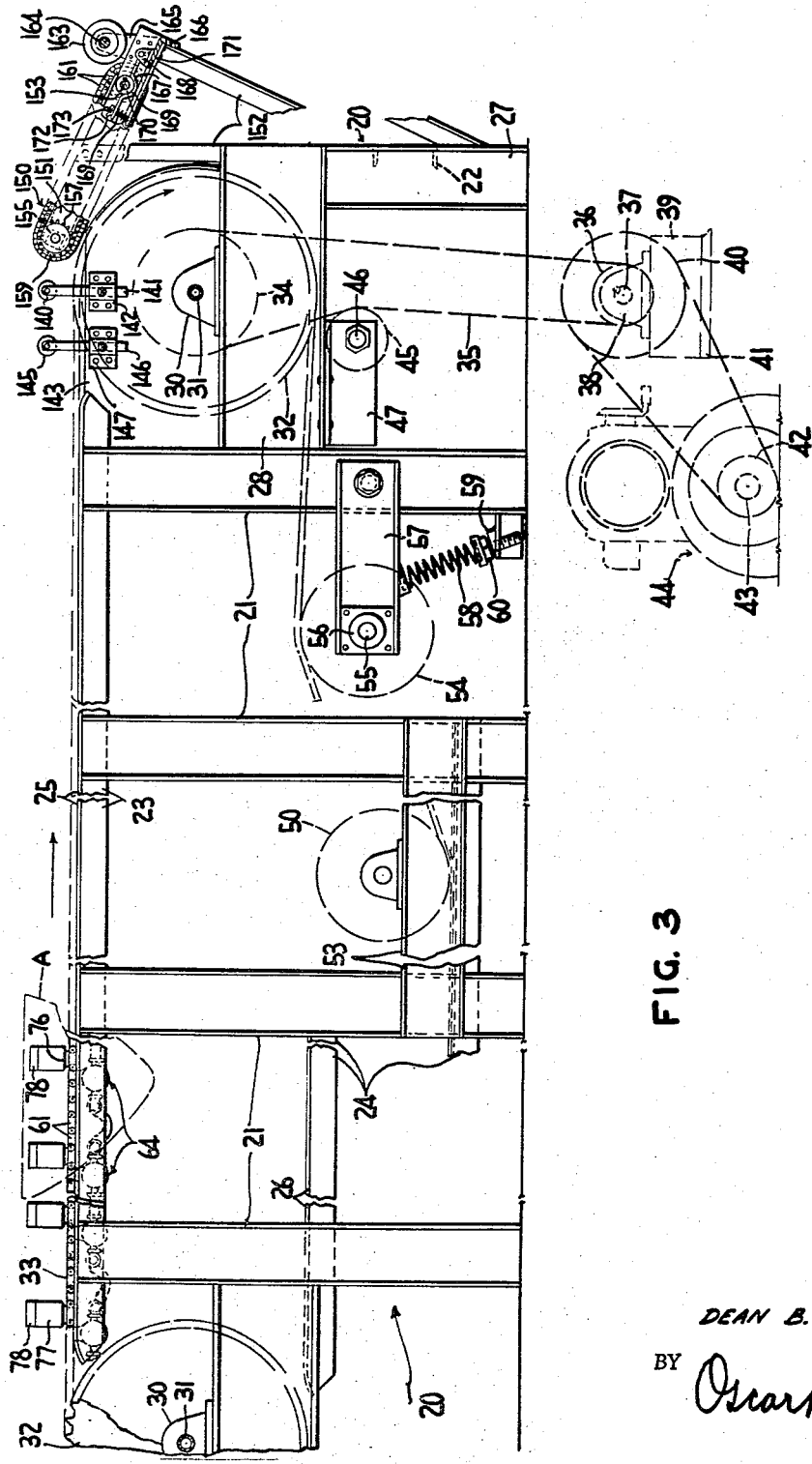

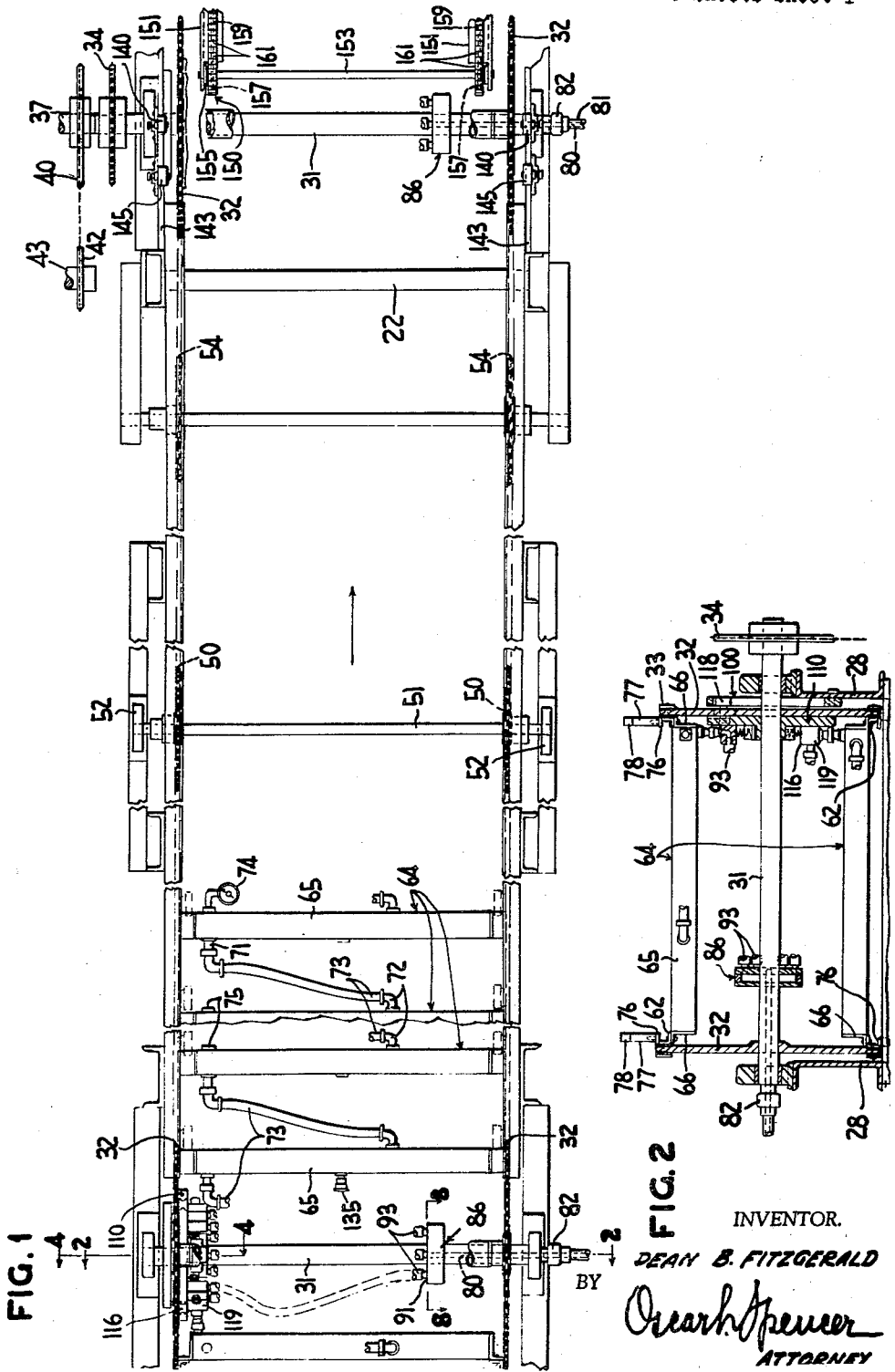
July 5, 1960
D. B. FITZGERALD
2,943,962
APPARATUS FOR LAMINATING
Filed Dec. 16, 1957
3 Sheets-Sheet 1
INVENTOR.
DEAN B. FITZGERALD
BY
ATTORNEY July 5, 1960

D. B. FITZGERALD 2,943,962

APPARATUS FOR LAMINATING

Filed Dec. 16, 1957

3 Sheets-Sheet 2

INVENTOR.
DEAN B. FITZGERALD

BY *Osrarh Spencer*

ATTORNEY

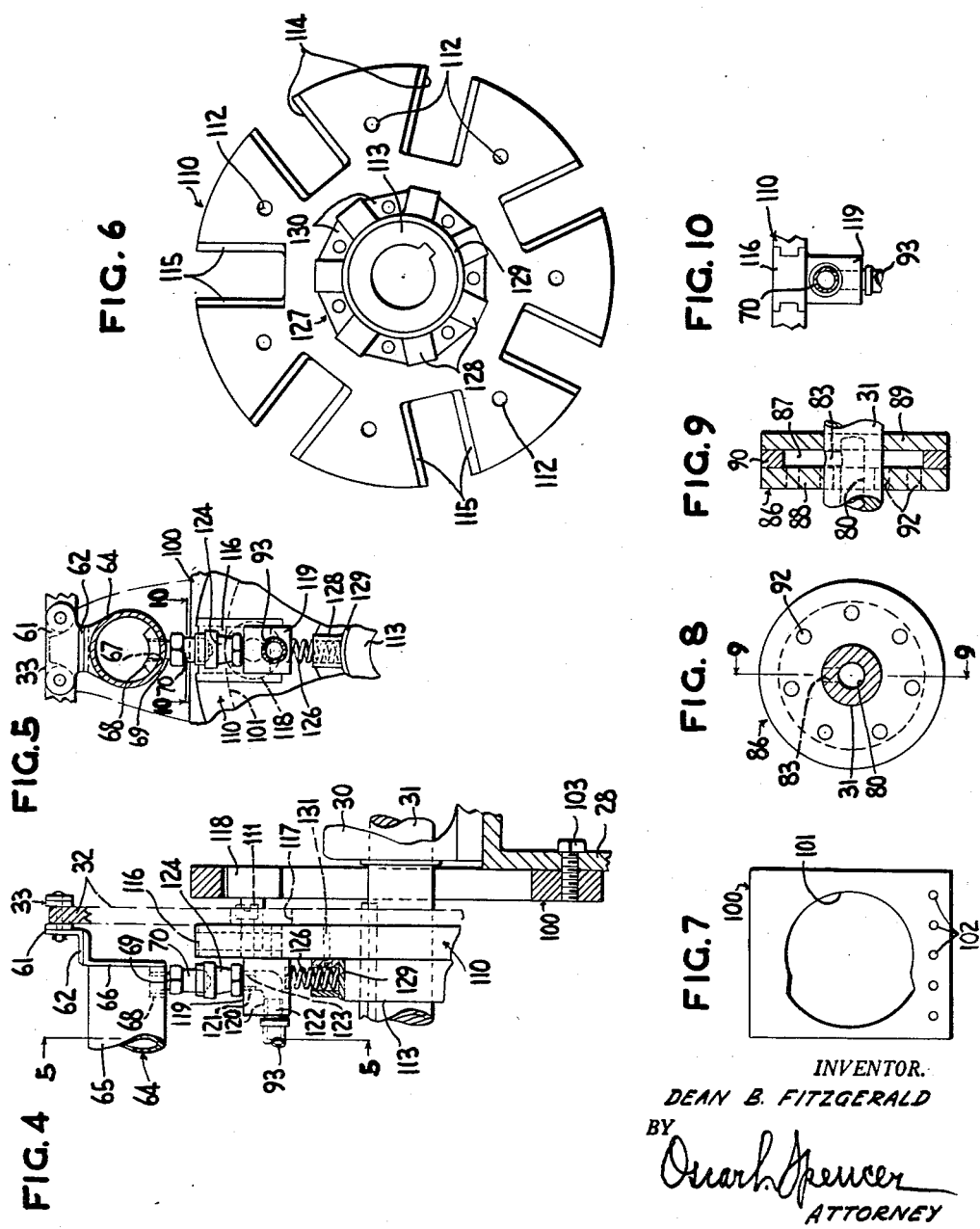
INVENTOR.
DEAN B. FITZGERALD
BY
Ouark Spencer
ATTORNEY

United States Patent Office 2,943,962
Patented July 5, 1960

2,943,962
APPARATUS FOR LAMINATING
Dean B. Fitzgerald, Crystal City, Mo., assignor to Pittsburgh Plate Glass Company, Allegheny County, Pa., a corporation of Pennsylvania
Filed Dec. 16, 1957, Ser. No. 703,205
10 Claims. (Cl. 154—2.7)

This invention relates to an apparatus for laminating a composite assembly of two glass sheets and a thermoplastic interlayer. The invention especially relates to an apparatus for the bonding of at least the marginal area of the interlayer to the glass sheets. This type of bonding is known as prepressing of a composite assembly. The article resulting from the prepressing is subsequently treated at an elevated temperature and pressure for bonding the glass sheets to the entire area of the thermoplastic interlayer.

With the development of the more complex types of laminated glass assemblies for use as windshields in automobiles it was not possible to preliminary press the composite assemblies by the use of an apparatus having a pair of nipper rolls. To laminate these composite assemblies, there were developed an apparatus and a method utilizing the apparatus. The apparatus is a continuous channel-shaped member that surrounds the composite assembly or sandwich. The channel-shaped member is essentially tubular and can be made from a piece of tubing that is split longitudinally and has its ends joined. A tube is connected to the channel-shaped member and is in alignment with a hole in the web or outermost wall of the channel-shaped member. The tube connected to the channel-shaped member is connected to a vacuum source for evacuating air from between the thermoplastic interlayer and the glass sheets of the composite assembly. While maintaining the vacuum the composite assembly is subjected to an elevated temperature to provide a bonding between the interlayer and the glass sheets in at least the marginal area. The channel-shaped member is then removed from around the composite assembly and the latter is subjected to an elevated temperature and an elevated pressure, for example, by the conventional treatment in an oil in an autoclave, to bond the plastic interlayer to the glass sheets throughout the entire area.

It is an object of this invention to provide an apparatus for laminating a composite assembly of two glass sheets and a thermoplastic interlayer in which the composite assembly is evacuated by means of a continuous channel-shaped member and the vacuum is continuously maintained while moving the channel-shaped member and the composite assembly through an oven for bonding at least the marginal area of the thermoplastic interlayer to the glass sheets.

Other objects of the present invention will be apparent to those skilled in the art from the description of the preferred embodiment of the apparatus which follows when taken in conjunction with the drawings in which like parts are designated by the same numeral and in which:

Fig. 1 is a plan view of the apparatus of the invention;
Fig. 2 is a vertical cross section of the apparatus taken along the line 2—2 of Fig. 1;
Fig. 3 is an elevation of the apparatus;
Fig. 4 is a fragmentary vertical cross section taken along the line 4—4 of Fig. 1 showing the automatic evacuating mechanism forming part of the apparatus;

Fig. 5 is a fragmentary vertical cross section taken along the line 5—5 of Fig. 4;
Fig. 6 is an elevation of the slide holder and the spring holder for the automatic evacuating mechanism;
Fig. 7 is an elevation of the cam of the automatic evacuating mechanism;
Fig. 8 is a cross section taken along the line 8—8 of Fig. 1 showing the manifold for the evacuating mechanism;
Fig. 9 is a cross section taken along the line 9—9 of Fig. 8; and
Fig. 10 is a fragmentary cross section taken along the line 10—10 of Fig. 5 showing one of the slide members in the slide holder.

The apparatus of the preferred embodiment of the invention has a supporting structure generally indicated at 20. Two rows of upright channel irons 21 of the supporting structure 20 are connected by channel irons 22. Channel irons 21 in each row are connected by top and bottom chain supports 23 and 24, respectively. Chain guides 25 are secured on the top of supports 23 and chain guides 26 are supported on top of supports 24.

Beyond the end upright channel irons 21 of each row there is a shorter upright channel iron 27 as shown for the right-hand end in Fig. 3. Horizontal channel irons 28 are supported on channel irons 27 and secured also to adjacent channel irons 21. A bearing 30 is mounted on each channel iron 28.

Shafts 31 are rotatably mounted in bearings 30. Between bearings 30 each of shafts 31 has keyed thereon a pair of sprockets 32. A pair of roller chains 33 is supported by top and bottom chain guides 25 and 26, respectively, and chains 33 engage sprockets 32.

The sprockets 32 on shaft 31 at the right-hand end, as viewed in Fig. 1, drive chains 33. The shaft 31 at the right-hand end also has a sprocket 34 keyed on it. A chain 35 engages and drives sprocket 34. The chain 35 also engages sprocket 36 keyed on shaft 37 rotatably mounted by bearings 38 mounted on supports 39 of the supporting structure 20. A sprocket 40 also keyed on shaft 37 is engaged by chain 41 that also engages sprocket 42 keyed on shaft 43 of a motor drive means generally indiacted at 44.

The chain 35 also engages an idler sprocket 45 rotatably mounted on a pin 46 to a bracket 47 adjustably supported by one of horizontal channel irons 28 at the right-hand end of Fig. 3.

Each of the chains 33 in the preferred embodiment is supported by one of the bottom chain guides 26 throughout the major length of the bottom run in a horizontal plane substantially below the bottom of sprockets 32. With this construction the bottom run of the chains and the parts connected to them are below and outside a lehr (not shown) through which the chains move in a major portion of their top run. At the right-hand end of the apparatus the chains 33 are brought down to the lower level by means of sprockets 50 keyed on shaft 51. The shaft 51 is rotatably mounted by bearings 52 supported on channel irons 53 secured to a pair of upright channel irons 21 near the base of the latter. Between sprockets 32 at the right-hand end and sprockets 50 the chains 33 also engage and are supported by a pair of idler sprockets 54 keyed on shaft 55 rotatably mounted by bearings 56 to supports 57 pivotally mounted to upright channel irons 21. The supports 57 are biased upwardly by means of springs 58. Brackets 59 are mounted to the base of the supporting structure 20. The bottom end of each spring 58 is in a recess in the head of a bolt 60 threaded at an inclined angle in bracket 59 for adjustment in the upward bias of supports 57. The other end of each of springs 58 is in a recess in support 57.

The bottom chain supports 24 and chain guides 26 are inclined upwardly so that at their left-hand ends they are horizontal in alignment with sprockets 32 at their bottom.

Some of the links 61 of each chain 33 that oppose links of the other chain 33 are provided with flanges 62. The apparatus has a number of vacuum tanks 64 that are cylinders 65 closed at their ends by flanged cap plates 66 which are bolted to flanges 62 of links 61. Each of the vacuum tanks 64 has an aperture 67 near one end. An internally threaded member 68 is welded to the inside of cylinder 64. A nipple 69 is secured through the aperture 67 in vacuum tank 64 by means of member 68. A male valved coupling 70 is mounted on the outside portion of nipple 69.

Adjacent vacuum tanks 64 are connected by nipples 71, elbows 72 and flexible vacuum hoses 73. The vacuum tank 64 has plates welded on it and threaded holes for receiving nipples 71 are through these plates and the walls of cylinder 65. Some of the vacuum tanks 64 are provided with vacuum gages 74 similarly connected by nipples in the walls of tanks 64 and these nipples in other tanks 64 are closed by caps 75.

Other links 61 of chains 33 have horizontal top flanges 76 that also extend toward the other chain. Supports 77 are secured on flanges 76 and resilient, such as rubber, supports 78 are secured on the top of supports 77. The supports 78 are positioned along chains 33 so that two supports 78 on each chain 33 will support a curved composite assembly A of two sheets of glass and a plastic interlayer. In the embodiment being illustrated these positions are chosen so that the composite assembly A has its ends pointing downwardly. Of course, more than four supports 78 can be used as a set to support a composite assembly. The sets of supports are spaced along the chains to provide suitable spacing between supported composite assemblies A. In the preferred arrangement one set of four supports 78 are used. There are four vacuum tanks 64 for each composite assembly. Of course, because all of the vacuum tanks 64 are interconnected all are a vacuum source for each composite assembly A.

Each of shafts 31 has a central or axial passage 80 from one end. That end of shaft 31 is joined to a vacuum pipe 81 by a swivel coupling 82. Adjacent the closed end of the passage 80 in shafts 31 there is a radial hole 83 to passage 80. A manifold 86 welded on each of shafts 31 has its chamber 87 in alignment with hole 83. Each of the manifolds 86 has an annular plate 88 and an annular plate 89 welded to a ring 90 to provide the chamber 87 between ring 90 and shaft 31. Nipples 91 are mounted in threaded apertures 92 in plate 88 on different radii. A flexible vacuum hose 93 is connected to each of nipples 91.

A cam plate generally indicated at 100 has a large hole to provide a cam surface 101 as indicated in Fig. 7. The cam plate 100 has threaded apertures 102 by which bolts 103 secure cam plate 100 to channel iron 28 supporting one of the bearings 30 at each end of the apparatus. The shafts 31 extend through the large hole in cam plates 100.

A slide holder generally indicated at 110 is secured by screws 111 in threaded apertures 112 to each of the sprockets 32 that is adjacent a cam plate 100. The slide holder 110 is keyed on shaft 31 along with sprocket 32. The slide holder 110 has a hub 113 and a number of radial slots 114. The walls of the slots 114 have longitudinal guide ribs 115. A slide member 116 is mounted in each of radial slots 114. Each slide member 116 has a longitudinal groove on two walls into which ribs 115 fit. Secured to each slide member 116 is a cam follower 118 with its threaded shaft extending through a radial slot 117 in sprocket 32.

Each slide member 116 has a flange 119 that extends normal to the plane in which the sprocket 32 rotates. The flange 119 has a pair of threaded passageways 120 and 121 communicating with each other. A nipple 122 is threaded in passageway 120. The flexible vacuum hoses 93 from manifold 86 are connected to nipples 122. A nipple 123 is threaded in passageway 121 and is connected to a female valved coupling 124. The female couplings 124 connected to flanges 119 of slide members 116 for each slide holder 110 are positioned by the direction of the threaded passageways 121 in flanges 119 so that each female coupling 124 is directed radially. The male coupling 70 for each vacuum tank 64 is positioned on the latter so that during the engagement of the chains 33 with sprockets 32 the male coupling 70 is pointing toward the axis of shaft 31 and is directly opposing the female coupling 124. The female coupling 124 is moved into engaging relationship with the male coupling 70 and with conventional valved couplings when this occurs the valves of both couplings are opened. The female coupling 124 is brought into this engagement by the outward radial movement of its slide member 116 which is thus moved by a spring 126.

The springs 126 are arranged radially in alignment with slide members 116. For this purpose a spring holder 127 is constructed, e.g., by welding a number of short pipes 128 to a ring 129. Apertured plates 130 welded between and to tubes 128 are secured by bolts 131 to holder 110. The ends of springs 126 are in pipes 128 and recesses in flanges 119 opposite couplings 124.

Outward radial movement of member 116 by spring 126 is limited part of the time by engagement of cam follower 118 against surface 101 of plate 100. When a segment of sprocket 32 is not engaged by chain 33, follower 118 in alignment with the segment is in rolling contact with a central part of a curved portion of surface 101 having a small radius. When this sprocket segment moves into engagement with chain 33, follower 118 engages an end part of that curved portion of surface 110. Then follower outwardly moves along an inclined cam surface portion so that spring 126 moves coupling 124 into engagement with coupling 70 of one of tanks 64 and with further rotation of the segment follower 118 is spaced from cam surface 101. The next substantial portion of surface 101 is curved with a large radius. Couplings 70 and 124 remain engaged. The segment moves opposite another inclined portion of surface 101 so that follower 118 is moved inwardly by that portion to disengage couplings 70 and 124. Follower 118 moves along the other end part of the curved portion of smaller radius to maintain coupling 124 in disengaging position until and after the sprocket segment and chain 33 are disengaged. Follower 118 moves along the central part of the curved portion of smaller radius to repeat the operation. With couplings 70 and 124 engaged, tank 64 is in direct communication through couplings 70 and 124, passageways 120 and 121, nipples 122 and 123, hose 93, manifold 86, passage 80, coupling 82 and flexible vacuum pipe 81 to the vacuum source (not shown). During this period of time of the rotation of the sprocket with the couplings in engagement the direct communication with the vacuum source will increase, if necessary, the vacuum in the tank 64 to the desired value. Each automatic engagement of one of tanks 64 with the vacuum source by engagement of couplings 124 and 70 as one of chains 33 engages its sprockets 32 maintains the vacuum in all of the interconnecting tanks.

One of vacuum tanks 64 of each set for use with composite assembly A is provided with a quick disconnect valved coupling 135 mounted like nipples 71 through the wall of cylinder 65. As mentioned above, only one of the vacuum tanks of the set has a vacuum gage 74. The plates welded on the tanks 64 that do not have vacuum gage 74 or coupling 135 are not drilled and tapped.

The chains move in the direction shown by the arrows. The couplings 135 are joined at the left-hand end of the apparatus, as viewed in Fig. 1, to the complementary coupling (not shown) mounted on the end of the rubber tubing joined to the continuous split tubing (not shown) after it is mounted around the margin of assembly A. At the right-hand end of the apparatus the coupling is disconnected from coupling 135 closing automatically the valve of the latter and the split tubing is removed from assembly A.

In Figs. 1, 2 and 3 only some of the vacuum tanks 64, their support flanges 62 on chains 33 and only some of the glass or composite assembly supports 78 on support flanges 76 of links 61 of chains 33 have been shown. It is to be understood that vacuum tanks 64 and glass supports 78 are spaced around the entire conveyor in a manner shown in the left-hand end of Figs. 2 and 3. For example, in one installation with a length of about 92 feet between shafts 31, there were 228 tanks 64 mounted to chains 33.

A pair of rolls 140 is mounted on rods 141 at the unloading end (right-hand end of Fig. 1) of chains 33. The rolls 140 are in the vertical plane passing through the axis of shaft 31. The rolls 140 are spaced apart so that supports 78 pass between them. The rods 141 are mounted for vertical adjustment on brackets 142 secured to plates 143 of the supporting structure 20. A pair of rolls 145 is also mounted by rods 146. The rolls 145 ported by brackets 147 on plates 143. The rolls 145 are to the left of rolls 140. Rolls 140 and 145 are positioned to support assembly A when the trailing pair of supports 78 of a set starts to move downwardly around sprockets 32. This support is necessary if assembly A has not been moved onto conveyor 150 so that its center of gravity is above conveyor 150. The assembly will move by gravity to the right down inclined conveyor 150 but until its center of gravity is above conveyor 150 rolls 140 and 145 support the trailing portion of assembly A and thereby prevent an undesirable rocking of assembly A.

A conveyor generally indicated at 150 is mounted on the supporting structure 20 by bearing holder plates 151 supported by brackets 152 of supporting structure 20. The plates 151 support a pair of shafts 153 by bearings 155. A pair of sprockets 157 is keyed on each shaft 153 and are spaced closer together than sprockets 32 on shaft 31. A pair of chains 159 rides at their top run on chain supports of plates 151 and engages sprockets 157. Each chain 159 has top-flanged links on which are secured rubber blocks 161. One of shafts 153 is in a plane passing through sprockets 32 engaging chains 33 at the unloading end. The other shaft 153 is lower and is beyond chains 33 and sprockets 32. With this arrangement chains 159 and their rubber blocks 161 provide an inclined conveyor 150 for unloading assemblies A from supports 78 and tilting assemblies A, one at a time.

Stop rolls 163 are mounted for free rotation on shaft 164 supported by brackets 165 on angle iron 166 supported by brackets 152. Rubber blocks 161 will support assembly A moved onto them at the top of inclined conveyor 150 and due to the weight of assembly A chains 159 will move so that the top run is downward. Assembly A will be stopped by rolls 163. An operator can easily lift the tilted assembly A from this portion of conveyor 150.

To control the speed of chains 159 when an assembly A is on blocks 161 the freedom of rotation of lower shaft 153 is varied by a brake 167 pivotally mounted at one end to bracket 168 on angle iron 166. The brake 167 has a curved central portion 169 urged upwardly against roll 170 keyed on shaft 153 by a spring 169 mounted between the free end of brake 167 and a plate 171 secured to angle iron 166. Upward movement of brake 167 against roll 170 is adjustably limited by wing nut 172 on the threaded end of pin 173 extending from plate 171 and through brake 167.

Tanks 64 preferably move through the oven with temperature zones of 270, 300 and 340° F. to heat to about 230° F. the glass surfaces of assembly A while maintaining a minimum vacuum in tanks 64 of 20 in. of mercury.

The foregoing description of the preferred embodiment of the apparatus of this invention has been presented for purpose of illustration only. Many modifications will be apparent to one skilled in the art. For example, instead of supporting an assembly A by supports 78 the vacuum tanks 64 can be constructed and arranged so that a pair of tanks can support one assembly with its ends pointed upwardly, if curved. Of course, in this modification there will be the continuous evacuating mechanism described above. In one modification of the continuous evacuating mechanism cam followers 118 can be moved by sprocket 32 in a continuous cyclic cam groove and this construction does not require springs 126 and associated parts. In another modification of the continuous evacuating mechanism valved couplings 124 can be moved, e.g., by pistons, into engaging position with valved couplings 70 as the latter are moved in an arcuate path by sprockets 32 engaging chains 33. Of course, couplings 70 and 124 can be interchanged, i.e., with couplings 124 on tanks 64 and couplings 70 mounted on sprocket 32 and moved by cam 100 or the like. The invention is limited only by the claims which follow.

I claim:

1. An apparatus for laminating a composite assembly of two glass sheets and a thermoplastic interlayer comprising vacuum tanks, means for conveying said vacuum tanks in a cyclic path having a rectilinear portion and an arcuate portion with a uniform radius of curvature, first coupling means, vacuum hose means connected to said first coupling means, means for moving said first coupling means in an arcuate path concentric with the arcuate portion of the cyclic path of the vacuum tanks at the same angular velocity as that of the vacuum tanks in said arcuate portion of movement, valved coupling means mounted on said vacuum tanks, and means for moving said first coupling means into operative engagement with said valved coupling means only during movement of said vacuum tanks in said arcuate portion whereby the first coupling means and the valved coupling means are operatively engaged during at least part of the arcuate portion of movement of the vacuum tanks and are disengaged during the movement of the vacuum tanks in said rectilinear portion of said cyclic path of said vacuum tanks.

2. An apparatus for laminating a composite assembly of two glass sheets and a thermoplastic interlayer comprising vacuum tanks, means for conveying said vacuum tanks in a cyclic path having a rectilinear portion and an arcuate portion with a uniform radius of curvature, first coupling means, vacuum hose means connected to said first coupling means, means for moving said first coupling means in an arcuate path concentric with the arcuate portion of the cyclic path of the vacuum tanks at the same angular velocity for the movement of the vacuum tanks in the arcuate portion of the cyclic path, valved coupling means mounted on said vacuum tanks to extend radially of the arcuate portion of the cyclic path when the vacuum tanks are in the arcuate portion of their movement, and means for moving said first coupling means radially into operative engagement with said valved coupling means during movement of said first coupling means in at least part of said arcuate path and during movement of said vacuum tanks in said arcuate portion.

3. An apparatus for laminating a composite assembly of two glass sheets and a thermoplastic interlayer comprising a supporting structure, vacuum tanks, conveyor means on the supporting structure for moving the tanks in a cyclic path having a horizontal portion and an arcuate portion having a uniform radius of curvature, said conveyor means including a shaft rotatably mounted to the supporting structure, motor means for operating said conveyor means, a plate mounted on said shaft and having radial slots, slide members mounted in said slots, first couplings connected to said slide members, vacuum hose means connected to said first couplings, valved couplings mounted to said vacuum tanks for operative engagement by said first couplings during the arcuate movement of said vacuum tanks, means for moving outwardly each of said slide members in said slots to a position for said operative engagement between said first couplings and said valved couplings and means for moving inwardly each of said slide members from said position during a part only of each revolution of each slide member about the axis of said shaft.

4. The apparatus of claim 3 wherein the means for moving each of said slide members outwardly includes springs and wherein the means for moving each slide member inwardly includes cam means.

5. An apparatus for laminating a composite assembly of two glass sheets and a thermoplastic interlayer comprising a supporting structure, vacuum tanks, a pair of shafts rotatably mounted to the supporting structure, a pair of sprockets fixed on each shaft, a pair of chains, each chain engaging a sprocket on each shaft, motor means for driving one of said shafts, each of said vacuum tanks being supported by a pair of links of said chains, means mounted to the supporting structure for supporting said chains in a horizontal path during part of the top run of said chains, a plate having radial slots and mounted on one of said shafts, slide members mounted in said slots, first valved couplings mounted to said slide members, second valved couplings mounted to said vacuum tanks for operative engagement by said first valved couplings during arcuate movement of said vacuum tanks provided by said sprockets on said shaft mounting said plate, springs for urging each of said slide members in said slots outwardly to a position for said operative engagement between said first couplings and said valved couplings, cam means for moving inwardly each of said slide members from said position during a part only of each revolution of said plate.

6. An apparatus for laminating a composite assembly of two glass sheets and a thermoplastic interlayer comprising a supporting structure, vacuum tanks, conveyor means on the supporting structure for moving the tanks in a cyclic path having a horizontal portion and an arcuate portion, said conveyor means including shafts rotatably mounted to the supporting structure, sprockets fixed on said shafts, one of said sprockets having radial slots, chains, each chain engaging a sprocket on each shaft and supporting one end of each vacuum tank, and motor means for driving one of said shafts, means mounted to the supporting structure for supporting said chains in a horizontal path during the top run of said chains, an evacuating mechanism including a plate having radial slots and secured to said sprocket having radial slots, slide members mounted in said slots in said plate, first valved couplings, vacuum hoses connected to said first valved couplings, springs for urging said slide members outwardly in said radial slots in said plate, cam followers mounted to said slide members and extending through said radial slots in said sprocket, and cam means engaging said cam followers for moving said slide means inwardly, during part only of each revolution of the slide member about the axis of the shaft mounting said plate, and second valved couplings mounted to said vacuum tanks and operatively engaged by said first valved couplings during part of the movement of the vacuum tanks in said arcuate path.

7. The apparatus of claim 6 and further including vacuum hoses interconnecting all vacuum tanks.

8. The apparatus of claim 6 and further including a manifold mounted on said shaft to provide an annular chamber, said vacuum hoses connected to said manifold, said shaft having a central passage open at one end and a radial hole communicating with said annular chamber, a swivel coupling mounted on the open end of said shaft, and a vacuum hose connected to said swivel coupling.

9. The apparatus of claim 6 wherein the cam means includes a plate having a large hole to provide a cam curved surface, said curved surface having a predetermined radius of curvature for one portion engaged by each cam follower when the first valved coupling for that slide member is to engage the second valved coupling and another portion having a larger radii of curvature opposing said cam follower for each first valved coupling to be completely disengaged from the opposing second valved coupling at the largest radius of curvature.

10. An apparatus for laminating a composite assembly of two glass sheets and a thermoplastic interlayer comprising a supporting structure, vacuum tanks, conveyor means on the supporting structure for moving the tanks in a cyclic path having a horizontal portion and an arcuate portion, said conveyor means including shafts rotatably mounted to the supporting structure, sprockets fixed on said shafts, one of said sprockets on each shaft having radial slots, chains, each chain engaging a sprocket on each shaft and supporting one end of each vacuum tank, and motor means for driving one of said shafts, means mounted to the supporting structure for supporting said chains in a horizontal path during the top run of said chains, an evacuating mechanism at each end of the conveyor, each of said evacuating mechanisms including a plate having radial slots and secured to said sprocket having radial slots, slide members mounted in said slots in said plate, first valved couplings, vacuum hoses connected to said first valved couplings, springs for urging said slide members outwardly in said radial slots in said plate, cam followers mounted to said slide members and extending through said radial slots in said sprocket, and cam means engaging said cam followers for moving said slide means inwardly, during part only of each revolution of the slide member about the axis of the shaft mounting said plate, and second valved couplings mounted to said vacuum tanks and operatively engaged by said first valved couplings during part of the movement of the vacuum tanks in said arcuate path.

References Cited in the file of this patent

UNITED STATES PATENTS 1,905,189   Sherts _____ Apr. 25, 1933

UNITED STATES PATENT OFFICE
CERTIFICATION OF CORRECTION

Patent No. 2,943,962                July 5, 1960

Dean B. Fitzgerald

It is hereby certified that error appears in the above numbered patent requiring correction and that the said Letters Patent should read as corrected below.

Column 5, lines 25 and 26, for ". The rolls 145 ported" read -- adjustably supported --.

Signed and sealed this 30th day of May 1961.

(SEAL)
Attest:

ERNEST W. SWIDER
Attesting Officer

DAVID L. LADD
Commissioner of Patents